(No Model.)

W. H. JOHNSON & J. W. McPHERSON.
BRAKE LEVER.

No. 245,959. Patented Aug. 23, 1881.

Witnesses.
Sidney P. Hollingsworth
Walter S. Dodge

Inventor.
W. H. Johnson,
J. W. McPherson
By Philip T. Dodge
atty.

UNITED STATES PATENT OFFICE.

WILLIAM H. JOHNSON AND JOHN W. McPHERSON, OF MOLINE, ILLINOIS.

BRAKE-LEVER.

SPECIFICATION forming part of Letters Patent No. 245,959, dated August 23, 1881.

Application filed May 13, 1881. (No model.)

*To all whom it may concern:*

Be it known that we, W. H. JOHNSON and J. W. McPHERSON, of Moline, in the county of Rock Island and State of Illinois, have invented certain new and useful Improvements in Brake-Levers; and we do hereby declare that the following is a full, clear, and exact description of the invention, which will enable others skilled in the art to which it appertains to make and use the same, reference being had to the accompanying drawings, which form a part of this specification.

This invention relates to an automatic locking and unlocking device for holding a hand-lever in any position which may be required, the improvement being applicable to levers for operating wagon-brakes or other devices or mechanisms.

The invention consists in the combination of a lever, a fixed plate or arm, and a locking-dog constructed and combined therewith in such manner that the movement of the lever in one direction causes the dog to lock automatically as the movement ceases, and that a movement of the lever in the opposite direction causes the dog to disengage and release the lever.

The essential feature of the invention consists in constructing the single dog to be locked and unlocked automatically by the movement of the lever.

Figure 1:
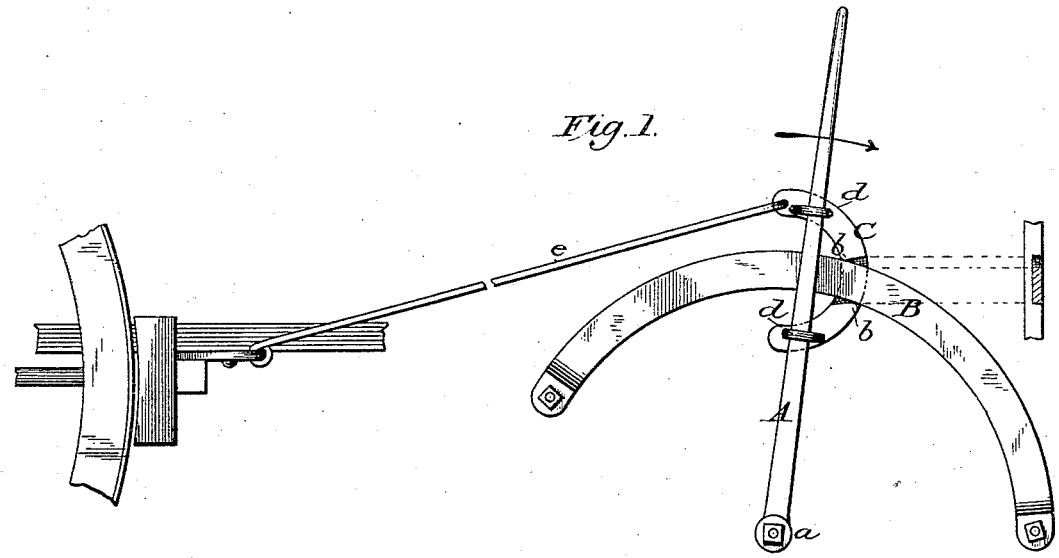
Figure 2:
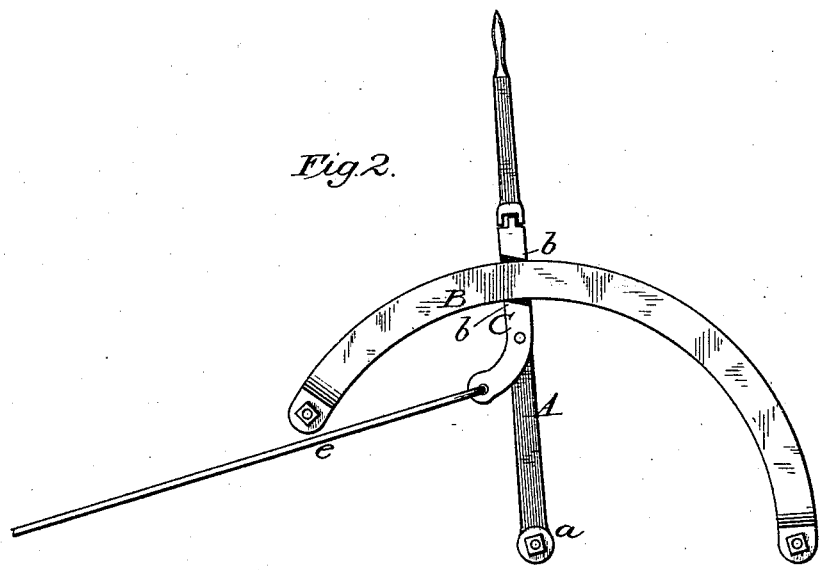

Referring to the accompanying drawings, Figures 1 and 2 are side elevations illustrating our device in two of its forms.

Referring to Fig. 1, A represents an upright hand-lever, pivoted at the point *a*.

B represents a stationary curved bar, upon which the locking-dog engages to hold the lever, this bar being preferably described from the point *a* as a center.

C represents the locking-dog mounted upon and carried by the lever, and arranged to lock upon the bar B. As shown in the drawings, the dog is provided with shoulders *b*, to engage with the upper and lower edges of the bar B, these shoulders being formed either by recessing the side of the dog, or by forming projecting shoulders thereon. The form of the shoulders is such that upon throwing the upper end of the dog backward, or the lower end forward, they will engage with the bar and prevent the dog from sliding backward thereon, but that upon tipping the dog in the opposite direction, the shoulders will unlock and permit the dog to slide freely backward on the bar. The dog is connected to the lever by means of two slotted ears, *d*, at the top and bottom of the dog, and to the upper end of the dog the rod *e*, for drawing upon the brake or other device, is secured.

Being thus constructed, the device operates as follows: On moving the lever forward, as indicated by the arrow, it strikes against the forward side of the upper loop *d*, thereby tipping and unlocking the dog, and sliding the same forward upon the bar, the dog in turn drawing the rod forward and operating the brake or other device to which it is attached. As soon as the lever is relieved from the forward pressure, the strain of the rod causes the dog to tip backward and lock fast upon the bar, thereby holding the lever and rod in position.

The device represented in Fig. 2 is substantially the same as that in Fig. 1. The lever and the curved bar are the same, but the dog is pivoted to the lever below the bar, and has the rod connected to its lower end below the pivot. The upper end of the dog will have a limited play in relation to the lever, either within a stud thereon, as shown, or in any other suitable manner, the form of the connection being immaterial, provided the play is limited by the lever. The strain of the rod tips the upper end of the dog forward, causing the dog to lock firmly upon the bar when the lever is free from forward pressure. A forward movement of the lever, advancing the lower end of the dog, releases the same, permitting the lever to be carried forward. A backward strain upon the upper end of the lever causes it to tip the top of the dog backward, thereby releasing the dog and permitting it to slide freely backward with the lever and rod.

It will be noted that in our device the dog and the lever interlock rigidly as the latter is moved forward, the lever thus imparting a positive motion to the dog, and thus to the rod, and at the same time holding the dog in such position that there is no friction whatever between it and the bar B. In this respect our device differs from all others hitherto constructed.

Having thus described the invention, what is claimed is—

1. The combination of a curved bar, the locking-dog slotted and arranged to embrace the outer edges of the bar, the draft-rod, and the hand-lever having a loose pivotal connection with the dog, substantially as described and shown.

2. In combination with the bar B, the straining-rod, the hand-lever, and the locking-dog C, mounted loosely upon the hand-lever, the bar being arranged to interlock rigidly with the lever as the latter is moved forward, whereby the dog is entirely relieved from friction upon the bar during the forward motion of the lever to strain the rod.

3. The combination of the bar, the lever, and the friction-dog, having its two ends provided with elongated openings or slotted ears, through which the lever is passed.

In testimony that we claim the foregoing as our own we have hereto affixed our signatures in presence of two witnesses.

WILLIAM H. JOHNSON.
JOHN W. McPHERSON.

Witnesses:
W. J. ENTRIKIN,
ADAM DICK.